United States Patent [19]
Paul

[11] Patent Number: 5,371,786
[45] Date of Patent: Dec. 6, 1994

US005371786A

[54] ELECTRONIC CROSS-CONNECT SYSTEM

[75] Inventor: Lawrence M. Paul, Randolph, N.J.

[73] Assignee: AT&T Bell Corp., Murray Hill, N.J.

[21] Appl. No.: 128,178

[22] Filed: Sep. 29, 1993

[51] Int. Cl.⁵ .............................................. H04Q 1/00
[52] U.S. Cl. .................................... 379/292; 379/268; 379/335
[58] Field of Search ............... 379/292, 291, 335, 327, 379/306, 279, 268

[56] References Cited

U.S. PATENT DOCUMENTS

| | | |
|---|---|---|
| 4,605,928 | 9/1986 | Georgia ........................ 379/292 X |
| 4,833,708 | 5/1989 | Goodrich ...................... 379/327 |
| 4,931,802 | 6/1990 | Assal et al. .................... 342/356 |

FOREIGN PATENT DOCUMENTS 3802579  8/1989  Germany ........................ 379/355

OTHER PUBLICATIONS

A. E. Joel, Jr., "On Permutation Switching Networks," Bell System Technical Journal, vol. 47, (1968), pp. 813–822.

Primary Examiner—James L. Dwyer
Assistant Examiner—Daniel Hunter
Attorney, Agent, or Firm—Lester H. Birnbaum

[57] ABSTRACT

Disclosed is a cross-connect system, such as a feeder distribution interface for telecommunications. User and feeder wires are each coupled to two sides of the matrix in order to provide flexibility in the electrical path. The switches, which are of the double-pole, double-throw variety, are employed at selected crosspoints of the switch matrix in such a manner as to reduce the number of switches required.

7 Claims, 2 Drawing Sheets

ELECTRONIC CROSS-CONNECT SYSTEM

BACKGROUND OF THE INVENTION

This invention relates to cross-connect systems.

In the telecommunications field, cross-connect systems are an essential part of coupling customers to the local switch. For example, feeder distribution interfaces are installed in neighborhoods and include a multiplicity of feeder lines from the switch, or from a remote terminal coupled to the switch, at a first set of terminals on one side of the interface. A multiplicity of user lines to customers' premises are coupled to a set of terminals at an opposite side of the interface. The two sets of terminals are usually manually interconnected by jumper wires so that a particular customer is connected to a particular feeder line.

A major problem with such feeder distribution interfaces arises when it is necessary to change a customer's connection to the feeder lines, as for example, when customers move into or out of the area or desire to add an extra phone line. In such cases, it is necessary to send a telephone technician to the site and manually change the jumper wire. This procedure is quite expensive, especially in rural or suburban areas.

It would be far more economical to change the connections remotely from the central office (see, e.g., U.S. Pat. No. 4,833,708). However, the cost of putting a switch or relay at each crosspoint in a switch matrix could be prohibitive. Thus, the art has sought ways of reducing the number of switches required in a cross-connect system. (See, e.g., U.S. Pat. No. 4,931,802.)

SUMMARY OF THE INVENTION

The invention is an electronic cross-connect system which includes a matrix of electrical connections. Double-pole, double-throw switches are located at selected crosspoints of the matrix. The matrix includes terminals on all four sides such that each input wire to the matrix is coupled to two sides of the matrix and each output wire is coupled to two other sides of the matrix. Means are provided outside the matrix for switching each wire between one of the two sides of the matrix to which it is connected.

BRIEF DESCRIPTION OF THE DRAWING

These and other features of the invention are delineated in detail in the following description. In the drawing.

DETAILED DESCRIPTION

The invention is described with reference to the feeder distribution interface illustrated in FIG. 1. However, it will be understood that the invention is applicable to other cross-connect systems.

The cross-connect system includes a matrix, 10, of electrical connections. That is, the matrix includes a plurality of horizontal (e.g., 11) and vertical (e.g., 12) conductive paths which meet at an array of crosspoints (e.g., 13). Selected ones of the crosspoints include switches (e.g., 14 and 15).

A set of feeder wires (e.g., 20 and 21) from a central office (22) and a set of user wires (e.g., 23 and 24) from individual homes (e.g., 25 and 26) are coupled to the matrix through a series of terminals (e.g., 27–30).

It will be recognized that it is the purpose of the cross-connect system to provide an electrical connection between each user wire (e.g., 23 and 24) and an associated one of the feeder wires (e.g., 20 and 21) to give phone service to the subscriber. It is not necessary that a particular user wire be connected to a particular feeder wire, as long as each user wire is coupled to any one of the feeder wires.

For purposes of illustration, only a 10×5 matrix array is shown. It should be appreciated that the invention is applicable to any m×n array. In a typical feeder distribution interface, m (horizontal conductors)=300 and n (vertical conductors)=150.

It will be noted that each user wire (e.g., 24) is electrically coupled to the matrix (10) by means of two supplemental wires (e.g., 31 and 32) coupled to terminals (27 and 28, respectively) at two opposite sides of the matrix. Similarly, each feeder wire (e.g., 21) is electrically coupled to the matrix by means of two supplemental wires (e.g., 33, 34) coupled to terminals (e.g., 29 and 30, respectively) on the two opposite sides of the matrix not coupled to the user wires. The supplemental wires are coupled to the feeder and user wires through standard switches (e.g., 35, 36, 37 and 38) such as crossbar switches. Thus, each feeder wire and user wire has access to either end of the matrix depending upon the activation of the crossbar switches coupled thereto.

Figure 2:
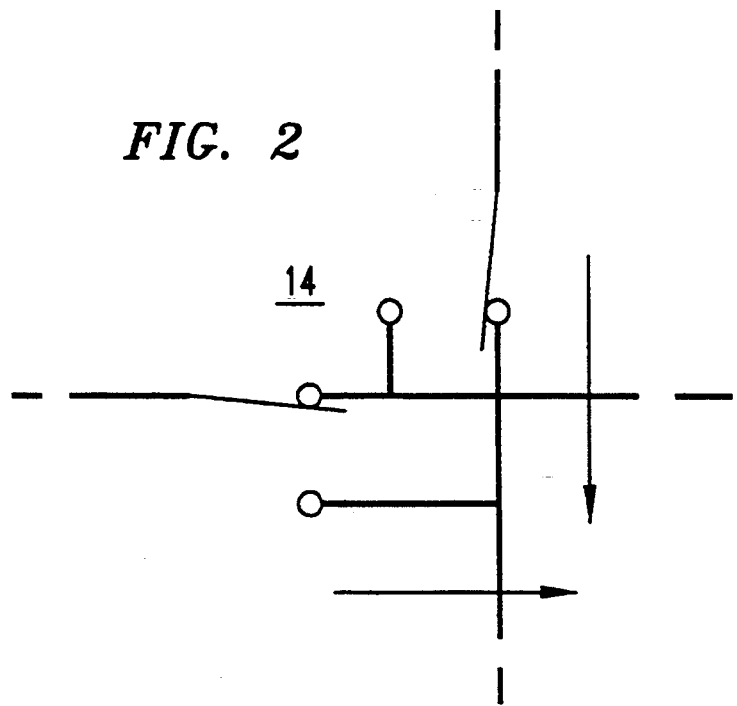
FIGS. 2 and 3 are enlarged views of a portion of the cross-connect system of FIG. 1.
Figure 3:
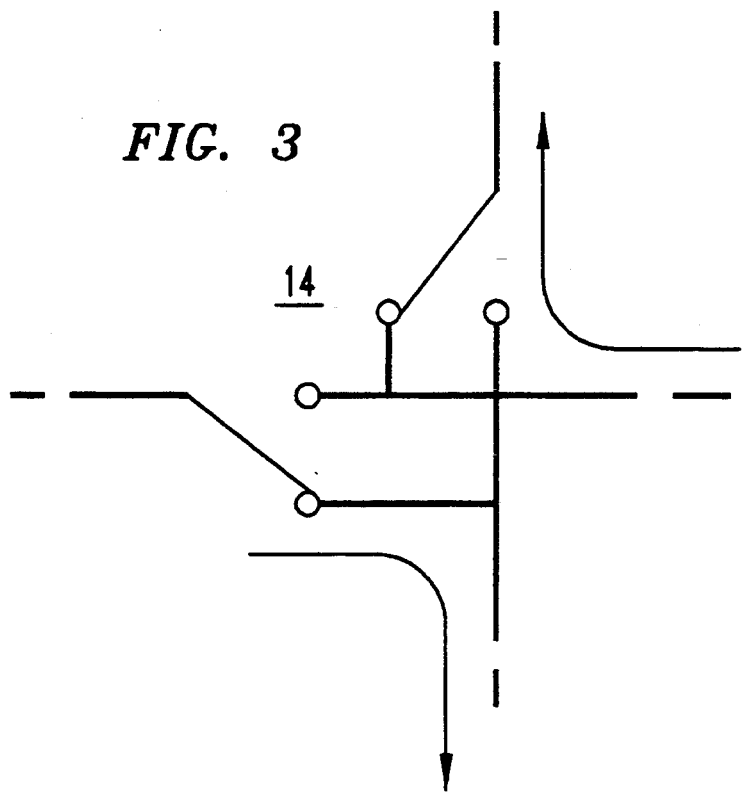

FIGS. 2 and 3 illustrate more clearly the type of switches, e.g., 14, located at the crosspoints of the switch matrix 10 and the direction of current flow into and out of the crosspoints. The switches are the double-pole, double-throw type which in their quiescent state (FIG. 2) permit current flow unimpeded in the horizontal and vertical directions as shown by the arrows. When the switch is activated, as shown in FIG. 3, any current flow from the left will be diverted downward and any current flow from the right will be diverted upward as indicated by the arrows.

The combination of coupling each user and feeder wire to two opposite sides of the matrix and employing double-pole, double-throw switches in the matrix results in tremendous flexibility in choosing a path for coupling any particular user wire to any one of the feeder wires such that the number of switches required is significantly reduced. The path may take many zigzag turns in the matrix (i.e., more than one horizontal and/or vertical paths), but the probability of finding an appropriate path is quite high since two independent paths may use the same switch (FIG. 3) and unused portions of the horizontal and vertical paths may be used for subsequent connections.

Several patterns of switch placement in the matrix can be utilized. One particularly useful approach in minimizing switches and ensuring connection is to employ four switches per row of the matrix (although only two switches per row are shown in the small matrix of FIG. 1). The first row of switches can be placed randomly in the crosspoints. In each succeeding row, the switches are displaced by one column to the right. When a switch appears in the last column in a particular row, a switch will be placed in the first column of the next succeeding row. This pattern of switch displacement can be repeated for any number of rows. If the matrix (m×n) is rectangular, the switches can again be placed randomly in the row following the last row of the square portion of the matrix (i.e., row n+1) and the pattern of displacing switches one column to the right repeated.

Alternatively, the switches can be displaced by one column to the left in each row.

A desirable feature resulting from this displacement is that an equal number of switches is employed in each column so that an equal burden of possible connections is placed on each feeder wire.

For example, an array of 300 rows (users) and 150 columns (feeder wires) utilizes only 1200 double-pole, double-throw switches in the matrix and 900 crossbar switches outside the matrix for diverting paths to the left or right or to the top or bottom of the matrix. This array results in a greater than 0.999 probability of successfully finding a path between a particular user and any one of the feeder wires. In the unlikely event that a path cannot be found, previously used paths can be rearranged. A greater or lesser number of switches can be employed depending upon the probability of success which is required for the particular system.

It will be understood from the above that the invention broadly provides a means for apportioning a set of limited resources (e.g., feeder wires) to a larger set of possible requesters (e.g., users). The number of switches required is dramatically reduced by employing double-pole, double-throw switches in a switch matrix and standard crossbar switches coupling the limited resources and requesters to the matrix. The crossbar switches permit each limited resource to be coupled to either of two sides (e.g., top and bottom) of the matrix and each requester to be coupled to either of the remaining sides (e.g., left and right) of the matrix. The double-pole, double-throw switches are wired so that activating the switches diverts left and right current paths to up and down paths so that each switch can provide two independent paths between a resource and a requester and unused portions of a row or column can be used for more than one path.

Displacement of the switches in each row permits an equal burden of possible requesters to be placed on each of the limited resources.

Figure 1:
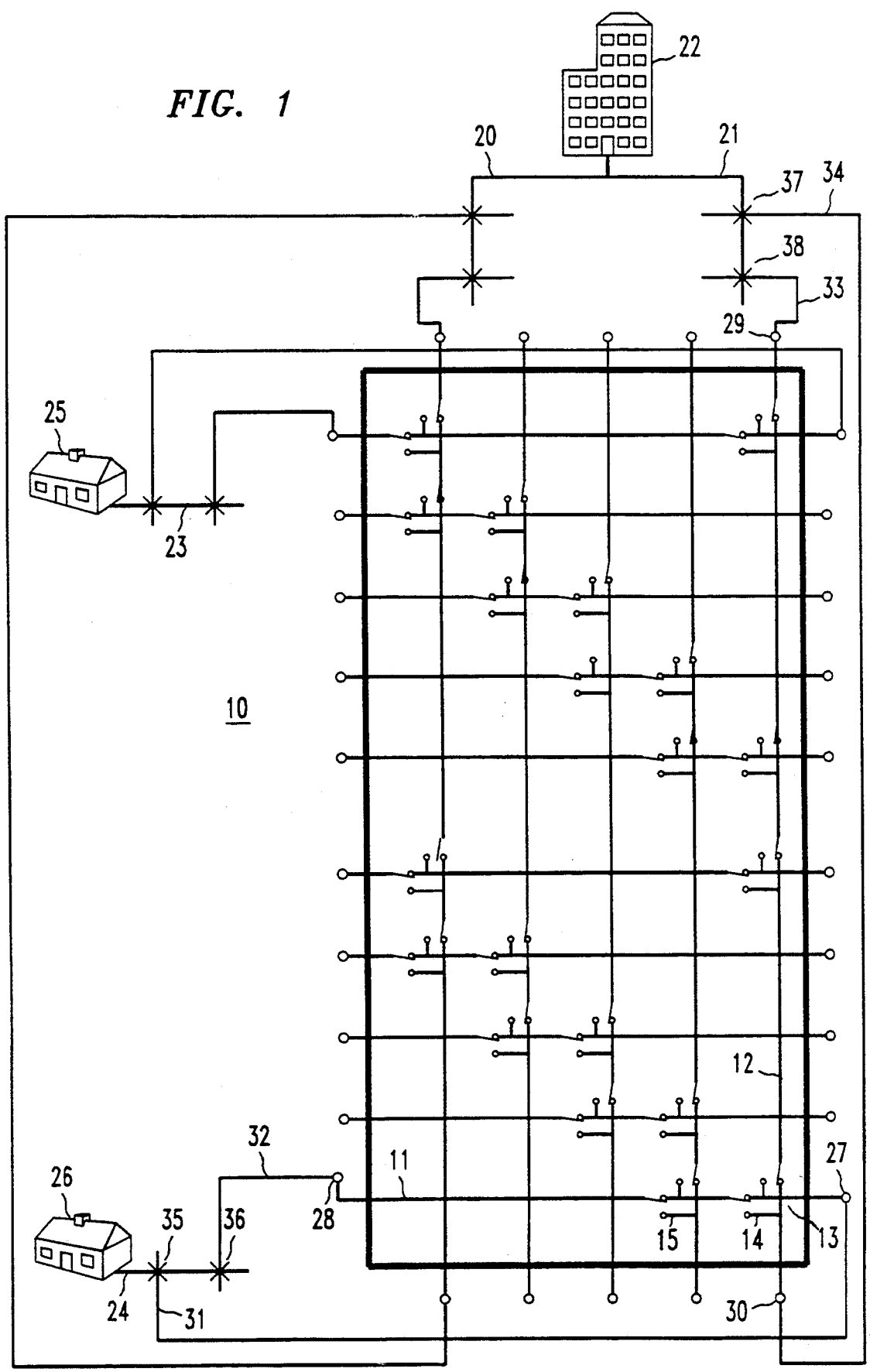
FIG. 1 is a schematic circuit diagram of a cross-connect system in accordance with an embodiment of the invention.

It will be understood that in the attached claims, the term "system" is intended to include the switch matrix and switches outside the matrix, but is not intended to include the central office or the users illustrated in FIG. 1.

Various modifications will become apparent to those skilled in the art. All such variations which basically rely on the teachings through which the invention has advanced the an are properly considered within the scope of the invention.

I claim:

1. An electronic cross-connect system comprising:
    an array of rows and columns of electrical connections having two opposite input sides and two opposite output sides; double-pole, double-throw switches located at selected crosspoints of the array and capable of providing electrical contact between the rows and columns at said crosspoints;
    means for providing electrical connection to the array by a series of input wires and output wires, said means including pairs of conductors coupled to each input wire and to each output wire, each conductor of a pair coupled to an input wire being also coupled to corresponding ones of the two input sides of the array and each conductor of a pair coupled to an output wire being also coupled to corresponding ones of the two output sides of the array, said means further including means outside the array for switching each input wire and output wire between the pair of conductors coupled thereto.

2. The system according to claim 1 wherein each switch is wired so that when the switch is in a quiescent state two current paths are formed through the switch, one in a row and the other in a column direction, but when the switch is activated, two paths are formed from a row to a column at the crosspoint in which the switch is located.

3. The system according to claim 1 wherein the means for switching outside the matrix comprises crossbar switches.

4. The system according to claim 1 wherein switches are placed in selected crosspoints in a first row of the matrix, and the placement of switches in each succeeding row is displaced by one column of the matrix in each succeeding row.

5. The system according to claim 4 wherein each row of the matrix has four switches.

6. The system according to claim 4 wherein each column of the matrix has an equal number of switches.

7. The system according to claim 1 wherein the number of inputs to the matrix is at least twice the number of outputs.

* * * * *